(12) United States Patent
Yiu et al.

(10) Patent No.: US 9,743,289 B2
(45) Date of Patent: Aug. 22, 2017

(54) SYSTEMS, METHODS, AND DEVICES FOR PRIORITIZING INTER-FREQUENCY MEASUREMENTS

(71) Applicants: Candy Yiu, Beaverton, OR (US); Yang Tang, Pleasanton, CA (US); Rui Huang, Beijing (CN)

(72) Inventors: Candy Yiu, Beaverton, OR (US); Yang Tang, Pleasanton, CA (US); Rui Huang, Beijing (CN)

(73) Assignee: INTEL IP CORPORATION, Santa Clara, CA (US)

( * ) Notice: Subject to any disclaimer, the term of this patent is extended or adjusted under 35 U.S.C. 154(b) by 224 days.

(21) Appl. No.: 14/583,263

(22) Filed: Dec. 26, 2014

(65) Prior Publication Data

US 2015/0327286 A1 Nov. 12, 2015

Related U.S. Application Data

(60) Provisional application No. 61/990,674, filed on May 8, 2014.

(51) Int. Cl.
*H04W 24/02* (2009.01)
*H04W 72/10* (2009.01)
(Continued)

(52) U.S. Cl.
CPC ....... *H04W 24/02* (2013.01); *H04W 72/0426* (2013.01); *H04W 72/10* (2013.01); *H04W 72/02* (2013.01)

(58) Field of Classification Search
CPC . H04W 24/02; H04W 72/0426; H04W 72/10; H04W 72/02; H04W 24/10;
(Continued)

(56) References Cited

U.S. PATENT DOCUMENTS

2010/0202307 A1 8/2010 Lee et al.
2012/0178465 A1 7/2012 Lin et al.
(Continued)

FOREIGN PATENT DOCUMENTS

SE WO-2012173568 A1 * 12/2012 ............ H04W 24/10

OTHER PUBLICATIONS

Broadcom Corporation, "Measurement gap configuration for Dual Connectivity", R2-141599, 3GPP TSG-RAN WG2 Meeting #85bis, Valencia, Spain, Mar. 31-Apr. 4, 2014, 6 pages.
(Continued)

*Primary Examiner* — Curtis A Alia
(74) *Attorney, Agent, or Firm* — Stoel Rives LLP (57) ABSTRACT

Systems and methods for prioritizing inter-frequency measurement are disclosed herein. User equipment (UE) may be configured to communicatively couple to an Evolved Universal Terrestrial Radio Access Network (E-UTRAN) Node B (eNB). The eNB may determine a priority for performing each of a plurality of inter-frequency measurement. The eNB may indicate the priority of each measurement to the UE. The eNB may transmit lists of higher priority and lower priority measurement objects. The lists may be separate and/or concatenated. Alternatively, or in addition, each measurement object may include a priority indicator, or the priority may be determined from the type of measurement object. In some embodiments, the eNB may provide indications of normal priority and low priority measurement objects and/or indications of normal priority and high priority measurement objects. The UE may perform measurements according to the indicated priorities.

14 Claims, 8 Drawing Sheets

(51) Int. Cl.
*H04W 72/04* (2009.01)
*H04W 72/02* (2009.01)

(58) Field of Classification Search
CPC ..... H04W 24/08; H04W 28/18; H04W 36/14; H04W 48/18
See application file for complete search history.

(56) References Cited

U.S. PATENT DOCUMENTS

2012/0202480 A1   8/2012  Franklin et al.
2012/0300657 A1  11/2012  Jung et al.
2013/0115955 A1*  5/2013  Deng ................ H04W 36/0061
                                                                455/437

OTHER PUBLICATIONS

PCT/US2015/024996, International Search Report and Written Opinion, Jul. 29, 2015, 12 pages.

* cited by examiner

SYSTEMS, METHODS, AND DEVICES FOR PRIORITIZING INTER-FREQUENCY MEASUREMENTS

RELATED APPLICATIONS

This application claims priority to and the benefit of U.S. Provisional Patent Application No. 61/990,674, filed May 8, 2014, which is hereby incorporated by reference herein in its entirety.

TECHNICAL FIELD

The present disclosure relates to systems, methods, and devices for prioritizing inter-frequency measurements.

DETAILED DESCRIPTION OF PREFERRED EMBODIMENTS

Wireless mobile communication technology uses various standards and protocols to transmit data between a base station and a wireless communication device. Wireless communication system standards and protocols can include, for example, the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In 3GPP radio access networks (RANs) in LTE systems, a base station may include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE). In LTE networks, an E-UTRAN may include a plurality of eNodeBs and may communicate with a plurality of UEs. An evolved packet core (EPC) may communicatively couple the E-UTRAN to an external network, such as the Internet.

LTE networks include radio access technology and core radio network architecture that provide high data rate, low latency, packet optimization, and improved system capacity and coverage. In LTE networks, a UE may communicatively couple with an eNB. The UE may move relative to an eNB to which the UE is coupled, so the signal strength and/or quality of the coupled eNB may decline and the eNB may no longer satisfy selection criteria. The UE may attempt to determine whether the signal from another eNB is stronger and/or higher quality. For example, the eNB may instruct the UE to measure the Reference Signal Received Power (RSRP), the Reference Signal Received Quality (RSRQ), and/or the like of another eNB. The UE may perform inter-frequency measurements of one or more carriers and/or one or more radio access technologies (RATs) associated with other eNBs. Depending on the results of the inter-frequency measurements, the UE may be handed over to another eNB. As used herein, measuring a frequency or measuring a carrier refers to performing a measurement (e.g., an inter-frequency measurement) of a signal (e.g., the RSRP, RSRQ, and/or the like of that signal) at that frequency or for that carrier.

UE performance may be improved if the UE is able to perform inter-frequency measurements on a large number of carriers. For example, the number of frequencies and/or RATs to monitor for different UE states may be as shown in tables 1 through 5.

TABLE 1

UTRA FDD Serving Cell, Idle Mode/UTRAN Registration Area (URA) Paging Channel (PCH)/Cell PCH

| RAT | Previous Minimum Requirement | New Requirement |
| --- | --- | --- |
| UTRA FDD Inter | 2 | 5 |
| UTRA TDD Inter | 3 | No change |
| GSM | 32 cells on up to 32 carriers = 1 layer | No change |
| E-UTRA FDD | 4 | 9 |
| E-UTRA TDD | 4 | 9 |
| Total layers including serving layer | 8 | 13 |
| Interfrequency cells | 32 | 80 with maximum of 32 cells per frequency |

TABLE 2

UTRA FDD Serving Cell, Cell Forward Access Channel (FACH)

| RAT | Previous Minimum Requirement | New Requirement |
| --- | --- | --- |
| UTRA FDD Inter | 2 | 5 |
| UTRA TDD Inter | 3 | No change |
| GSM | 32 cells on up to 32 carriers = 1 layer | No change |
| E-UTRA FDD | 4 | 9 |
| E-UTRA TDD | 4 | 9 |
| Total layers including serving layer | 8 | 13 |
| Interfrequency cells | 32 | 80 with maximum of 32 cells per frequency |

TABLE 3

UTRA FDD Serving Cell, Cell Dedicated Channel (DCH)

| RAT | Previous Minimum Requirement | New Requirement |
|---|---|---|
| UTRA FDD Inter | 2 | 5 |
| UTRA TDD Inter | 3 | No change |
| GSM | 32 cells on up to 32 carriers =1 layer | No change |
| E-UTRA FDD | 4 | 9 |
| E-UTRA TDD | 4 | 9 |
| Total layers including serving layer | 8 | 13 |
| Interfrequency cells | 32 | 80 with maximum of 32 cells per frequency |

TABLE 4

E-UTRA Serving Cell, Radio Resource Control (RRC) Idle

| RAT | Previous Minimum Requirement | New Requirement |
|---|---|---|
| UTRA FDD InterRAT | 3 | 6 |
| UTRA TDD InterRAT | 3 | 7 |
| InterRAT UTRA Cells | No explicit neighbor cell list (NCL) for UTRA in E-UTRA idle mode | No explicit NCL for UTRA in E-UTRA idle mode |
| GSM InterRAT | 32 cells on up to 32 carriers = 1 layer | No change |
| E-UTRA FDD | 3 | 8 |
| E-UTRA TDD | 3 | 8 |
| E-UTRA FDD RSTD | N/A | No change |
| E-UTRA TDD RSTD | N/A | No change |
| CDMA 2000 1x | 3 | No change |
| HRPD | 3 | No change |
| Total layers including serving frequency | 8 | 13 |

TABLE 5

E-UTRA Serving Cell, RRC Connected

| RAT | Previous Minimum Requirement | New Requirement |
|---|---|---|
| UTRA FDD InterRAT | 3 | 6 |
| UTRA TDD InterRAT | 3 | 7 |
| InterRAT UTRA Cells | 32 | 80 with maximum of 32 cells per frequency |
| GSM InterRAT | 32 cells on up to 32 carriers = 1 layer | No change |
| E-UTRA FDD | 3 | 8 |
| E-UTRA TDD | 3 | 8 |
| E-UTRA FDD RSTD | N/A | No change |
| E-UTRA TDD RSTD | N/A | No change |
| CDMA 2000 1x | 3 | No change |
| HRPD | 3 | No change |
| Total layers including serving frequency | 8 | 13 |

The length of time required to perform the inter-frequency measurements may increase linearly with the number of carriers being monitored. As a result, a UE may fail to perform a timely measurement of eNBs to which handover should be performed. For example, a UE moving at high speed may not be able to perform all the necessary measurements before a handover is required. In such a situation, UE traffic may be interrupted and/or lost for UEs in the connected state. Accordingly, it may be desirable to order measurements so that the eNB to which the UE is going to handover is measured before handover is required.

The RAN may determine one or more measurements that the UE should perform and may determine a priority for each measurement to be performed. The higher priority measurements may be performed by the UE sooner and/or more frequently than the lower priority measurements. For example, in one configuration, macro cells may be given higher priority and small cells may be given lower priority. The UE may be more likely to find a suitable macro cell that will prevent traffic interruption than a small cell that will do the same. The UE can then use the lower priority measurements to search for small cells that may provide better performance. The particular order in which the UE performs the higher priority and lower priority measurements may be implementation specific. In an embodiment, delay requirements within which the UE must perform higher priority measurements and delay requirements within which the UE must perform lower priority measurements may be predetermined.

Various levels of granularity may be used to specify the priority. For example, there may be two, three, four, five, or more different levels of priority. In different embodiments, the priority levels may have different relationships with a default or legacy priority. In an embodiment with two priority levels, a lower priority level may be a normal priority and a higher priority level may be a high priority. High priority measurements may be performed more frequently than mandated by legacy delay requirements. In another embodiment with two priority levels, a higher priority level may be a normal priority and a lower priority level may be a low priority. Low priority measurements may be performed less frequently than mandated by legacy delay requirements. A predetermined or dynamically indicated scaling factor may be used to determine the delay requirement for high or low priority measurements from the delay requirement for normal priority measurements. In abstract syntax notation, one embodiment of an information element including a scaling factor may be expressed:

```
-- ASN1START
MeasScaleFactor-r12 ::=    ENUMERATED
                           {sf-EUTRA-cf1, sf-EUTRA-cf2}
-- ASN1STOP
```

In an embodiment, the RAN may transmit an information element (IE) containing a list of normal priority measurement objects to the UE to indicate which measurements should be performed. The RAN may also transmit an IE containing a list of high priority and/or low priority measurement objects to the UE. The list of normal priority measurement objects and the list of high or low priority measurement object may be concatenated together to create an additional IE containing a list of all measurement objects. In abstract syntax notation, information elements for indicating prioritized measurements in one embodiment may be expressed:

```
-- ASN1START
MeasObjectToAddModList-Rxx ::=       SEQUENCE {
    measObjectToAddModList               MeasObjectToAddModList,
```

-continued

```
    measObjectToAddModListHigh-Rxx       MeasObjectToAddModList-Rxx
}
MeasObjectToAddModList ::=               SEQUENCE (SIZE (1..maxObjectId)) OF
MeasObjectToAddMod
MeasObjectToAddModListHigh-Rxx ::=       SEQUENCE (SIZE (1..maxObjectId-Rxx)) OF
MeasObjectToAddMod-Rxx
MeasObjectToAddMod ::=                   SEQUENCE {
    measObjectId                             MeasObjectId,
    measObject                               CHOICE {
        measObjectEUTRA                          MeasObjectEUTRA,
        measObjectUTRA                           MeasObjectUTRA,
        measObjectGERAN                          MeasObjectGERAN,
        measObjectCDMA2000                       MeasObjectCDMA2000,
        ...
    }
}
MeasObjectToAddMod-Rxx ::=               SEQUENCE {
    measObjectId                             MeasObjectId,
    measObject                               CHOICE {
        measObjectEUTRA                          MeasObjectEUTRA,
        ...
    }
}
maxObjectId-Rxx ::= 8 (this number may vary)
-- ASN1STOP
```

In an embodiment, the RAN may transmit an IE containing a list of normal priority measurement objects. The RAN may also transmit a separate IE containing a list of high priority and/or low priority measurement objects to the UE without transmitting an IE containing a concatenation of the normal priority IE and the high and/or low priority IE. The normal priority IE may include measurement objects that are also included in the high and/or low priority IE to provide legacy support. In abstract syntax notation, information elements for indicating prioritized measurements in one embodiment may be expressed:

```
-- ASN1START
MeasObjectToAddModList ::=               SEQUENCE (SIZE (1..maxObjectId)) OF
MeasObjectToAddMod
MeasObjectToAddModListHigh-Rxx ::=       SEQUENCE (SIZE (1..maxObjectId-Rxx)) OF
MeasObjectToAddMod-Rxx
MeasObjectToAddMod ::=                   SEQUENCE {
    measObjectId                             MeasObjectId,
    measObject                               CHOICE {
        measObjectEUTRA                          MeasObjectEUTRA,
        measObjectUTRA                           MeasObjectUTRA,
        measObjectGERAN                          MeasObjectGERAN,
        measObjectCDMA2000                       MeasObjectCDMA2000,
        ...
    }
}
MeasObjectToAddMod-Rxx ::=               SEQUENCE {
    measObjectId                             MeasObjectId,
    measObject                               CHOICE {
        measObjectEUTRA                          MeasObjectEUTRA,
        ...
    }
}
maxObjectId-Rxx ::= 8 (this number may vary)
-- ASN1STOP
```

In an embodiment, the measurement objects transmitted from the RAN to the UE may each include a priority indicator that specifies the priority for that particular measurement object. For example, the priority indicator may simply be a zero or a one to indicate a low priority or a normal priority or to indicate a normal priority or a high priority. The RAN may transmit an IE containing a list of legacy measurement objects as well as transmitting an IE containing a list of measurement objects with the priority indicator. Alternatively, the RAN may transmit only an IE containing a list of measurement objects with the priority indicator. In abstract syntax notation, information elements for indicating prioritized measurements in one embodiment may be expressed:

```
-- ASN1START
MeasObjectToAddModList ::=               SEQUENCE (SIZE (1..maxObjectId)) OF
MeasObjectToAddMod
MeasObjectToAddMod ::=                   SEQUENCE {
```

```
    measObjectId              MeasObjectId,
    measObject                CHOICE {
        measObjectEUTRA           MeasObjectEUTRA,
        measObjectUTRA            MeasObjectUTRA,
        measObjectGERAN           MeasObjectGERAN,
        measObjectCDMA2000        MeasObjectCDMA2000,
        ...
    }
}
MeasObjectToAddModList-Rxx ::=    SEQUENCE (SIZE (1..maxObjectId-Rxx)) OF
MeasObjectToAddMod-Rxx
MeasObjectToAddMod-Rxx ::=    SEQUENCE {
    measObjectId              MeasObjectId,
    priorityIndicator         ENUMERATED {0,1},
    measObject                CHOICE {
        measObjectEUTRA           MeasObjectEUTRA,
        measObjectUTRA            MeasObjectUTRA,
        measObjectGERAN           MeasObjectGERAN,
        measObjectCDMA2000        MeasObjectCDMA2000,
        ...
    }
}
maxObjectId-Rxx ::= 13 (this number may vary)
-- ASN1STOP
```

In an embodiment, the priority indicator may be a parameter within one or more particular types of measurement object. For example, an embodiment of an EUTRA measurement object may be expressed in abstract syntax notation as:

```
-- ASN1START
MeasObjectEUTRA ::=           SEQUENCE {
    carrierFreq                   ARFCN-ValueEUTRA,
    allowedMeasBandwidth          AllowedMeasBandwidth,
    presenceAntennaPort1          PresenceAntennaPort1,
    neighCellConfig               NeighCellConfig,
    offsetFreq                    Q-OffsetRange
        DEFAULT dB0,
    -- Cell list
    cellsToRemoveList             CellIndexList
        OPTIONAL,    -- Need ON
    cellsToAddModList             CellsToAddModList
        OPTIONAL,    -- Need ON
    -- Black list
    blackCellsToRemoveList        CellIndexList
        OPTIONAL,    -- Need ON
    blackCellsToAddModList        BlackCellsToAddModList
        OPTIONAL,    -- Need ON
    cellForWhichToReportCGI       PhysCellId
        OPTIONAL,    -- Need ON
    ...,
    reducedMeasPerformance-r12    BOOLEAN
        OPTIONAL     -- Need ON
}
-- ASN1STOP
```

In an embodiment, different measurement objects may correspond to each RAT. For example, the type of measurement object for each RAT may be different. The types of measurement object may be expanded to include a high or low priority measurement object corresponding to each RAT in addition to the normal priority, legacy measurement objects. This embodiment may allow for backward compatibility. An IE containing a list of measurement objects including normal priority and high or low priority measurement objects may be transmitted to the UE. For any high or low priority measurement objects in the IE, the IE may include a legacy measurement object. A UE unable to process the high or low priority measurement objects may use the legacy measurement object and disregard the priority measurement objects, and a UE able to process high or low priority measurement objects may disregard the legacy measurement object and use the priority measurement objects. The maximum number high or low priority measurement objects of each type that can be configured may need to be specified in advance. Additionally, the maximum number of objects may need to be increased relative to a legacy embodiment. In abstract syntax notation, information elements for indicating prioritized measurements in one embodiment may be expressed:

```
-- ASN1START
MeasObjectToAddModList ::=    SEQUENCE (SIZE (1..maxObjectId)) OF
MeasObjectToAddMod
MeasObjectToAddMod ::= SEQUENCE {
    measObjectId              MeasObjectId,
    measObject                CHOICE {
        measObjectEUTRA           MeasObjectEUTRA,
        measObjectUTRA            MeasObjectUTRA,
        measObjectGERAN           MeasObjectGERAN,
        measObjectCDMA2000        MeasObjectCDMA2000,
        measObjectEUTRAHigh-Rxx   MeasObjectEUTRA
        ...
    }
}
-- ASN1STOP
```

Figure 1:
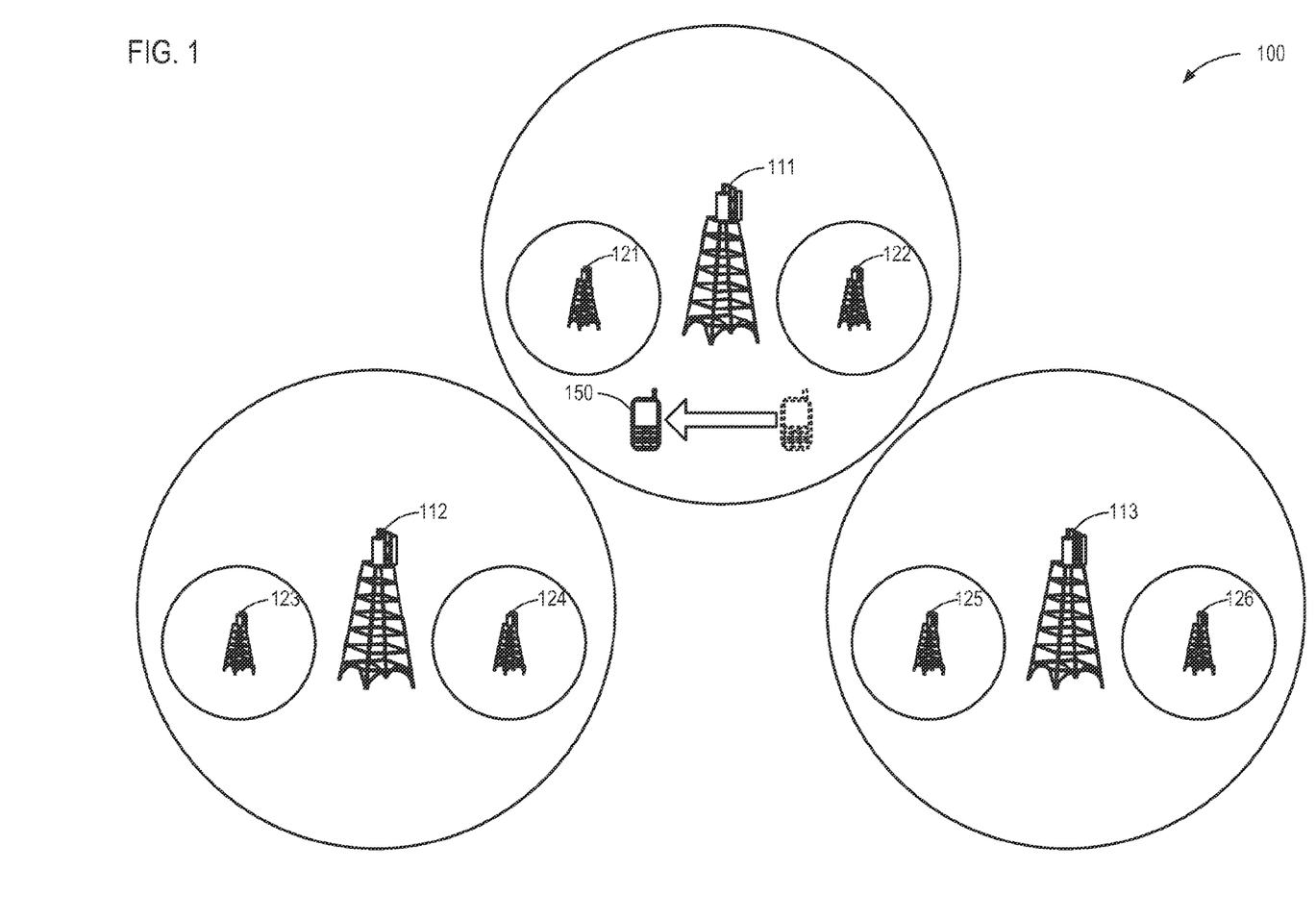
FIG. 1 is a schematic diagram of a system comprising a plurality of macro cell eNBs and a plurality of small cell eNBs.

FIG. 1 is a schematic diagram of a system 100 comprising a plurality of macro cell eNBs 111, 112, 113 (e.g., a coverage layer) and a plurality of small cell eNBs 121, 122, 123, 124, 125, 126 (e.g., an offloading layer). A UE 150 may be coupled to a macro eNB 111 and may be travelling relative to the eNB. The eNB 111 may be configured to transmit a plurality of measurement objects to the UE 150 to indicate a plurality of inter-frequency measurements that should be performed by the UE 150. The UE 150 may perform the inter-frequency measurements on carriers associated with other nearby cells 112, 113, 121-126 (e.g., femto cells, pico cells, micro cells, other macro cells, etc.). The inter-frequency measurements may include measurements of RSRP, RSRQ, and/or the like for each nearby eNB 112, 113, 121-126.

If there are a large number of nearby eNBs 112, 113, 121-126, it may take a long time for the UE 150 to perform the inter-frequency measurements. In such a situation, the UE 150 may lose the connection with the macro eNB 111 before the UE 150 has finished the measurements. A target eNB may not have been selected for handover, so communication by the UE 150 with a remote entity may be disrupted. Accordingly, the UE 150 may prioritize measurements of the eNBs that are more likely to satisfy reselection criteria over the eNBs that are less likely to satisfy the reselection criteria. In the illustrated embodiment, the macro cell eNBs 112, 113 may be more likely to satisfy the reselection criteria, so measurements targeting the macro cell eNBs 112, 113 may receive higher priority.

Figure 2A:
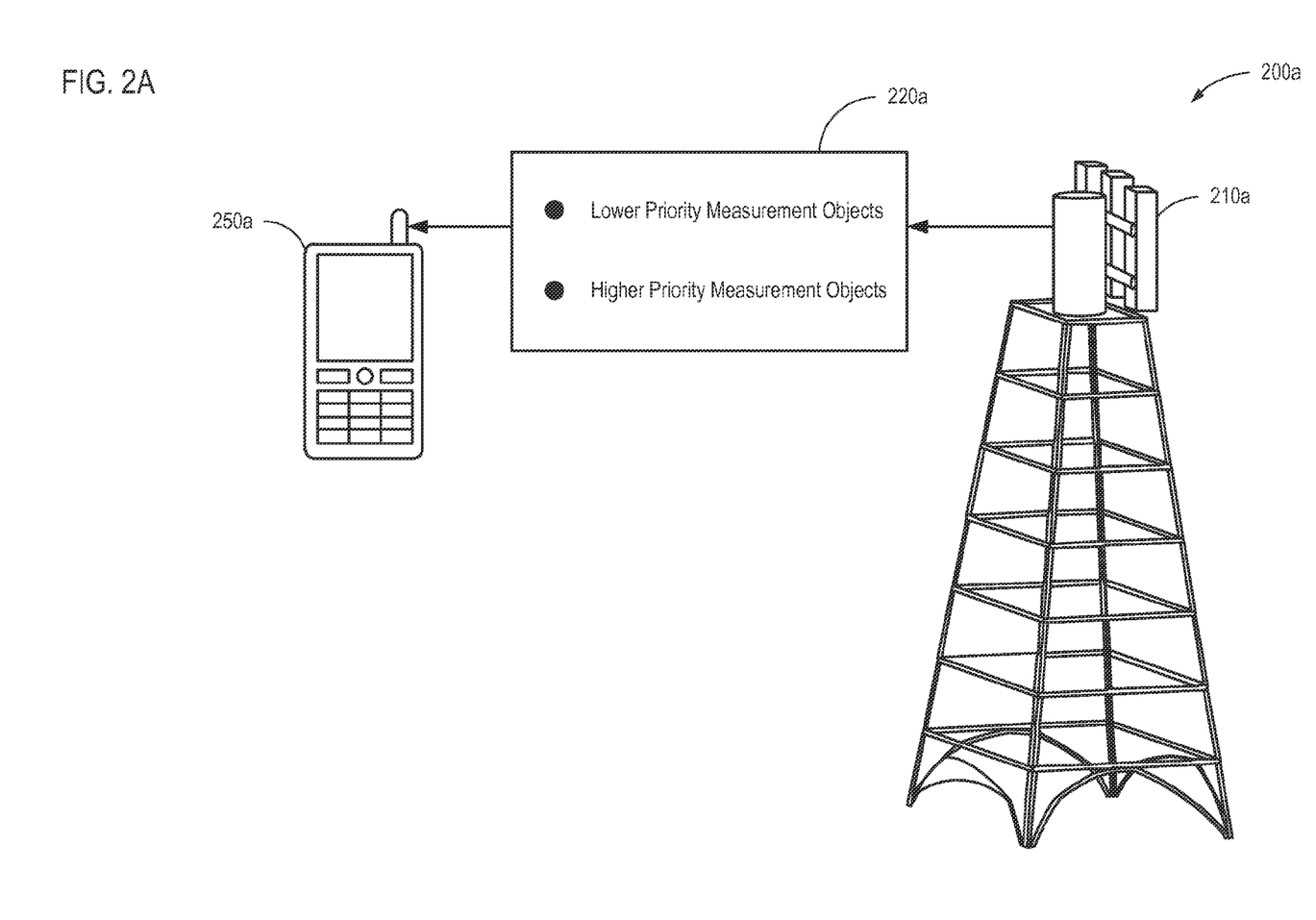
FIG. 2A is a schematic diagram of a system including an eNB configured to indicate the priority of measurement objects to a UE according to an embodiment.

FIG. 2A is a schematic diagram of a system 200a including an eNB 210a configured to indicate the priority of measurement objects to a UE 250a according to an embodiment. The eNB 210a may transmit a single IE 220a that includes a list of lower priority measurement objects concatenated with a list of higher priority measurement objects. In some embodiments, the eNB 210a may also transmit a separate IE including the list of lower priority measurement objects and/or a separate IE including the list of higher priority measurement objects in addition to the concatenated list. Each measurement object, whether lower priority or higher priority, may include any information that is needed by the UE 250a to perform the corresponding measurements indicated by the measurement object.

The UE 250a may determine the order in which to perform the indicated measurements. In an embodiment, the delay requirement within which the UE 250a must perform the measurements may be predetermined. There may be a first period within which higher priority measurements must be performed and a second period within which lower priority measurements must be performed. The UE 250a may determine the order in which to perform the measurements based on the priorities and the delay requirements for performing each kind of measurement. The manner in which the UE 250a determines the order may be implementation specific.

Figure 2B:
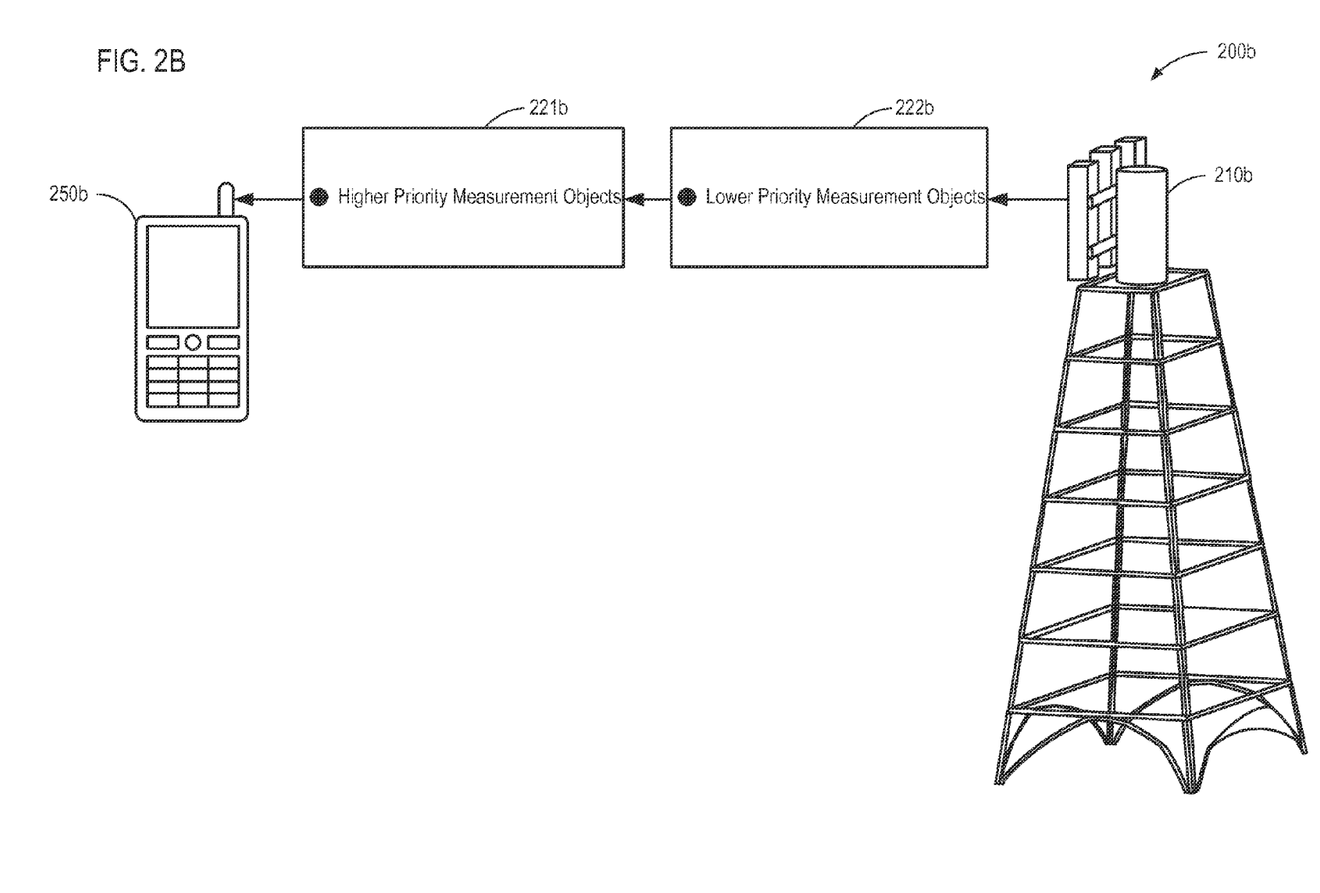
FIG. 2B is a schematic diagram of a system including an eNB configured to indicate the priority of measurement objects to a UE according to another embodiment.

FIG. 2B is a schematic diagram of a system 200b including an eNB 210b configured to indicate the priority of measurement objects to a UE 250b according to another embodiment. The eNB 210b may transmit an IE 221b including a list of higher priority measurement objects and an IE 222b including a list of lower priority measurement objects. However, the eNB 210b may not transmit an IE with the two lists concatenated together. One of the IEs 221b, 222b may include a list of normal priority measurement objects. In an embodiment, the list of normal priority measurement objects may also include measurement objects for low or high priority measurements. A legacy UE may process all the measurement objects as normal priority objects and may disregard the IE 221b, 222b that includes low or high priority objects. A UE with priority capabilities may determine which measurement objects are duplicative across both IEs 221b, 222b and ensure they receive high or low priority treatment as according to the particular configuration.

Figure 3A:
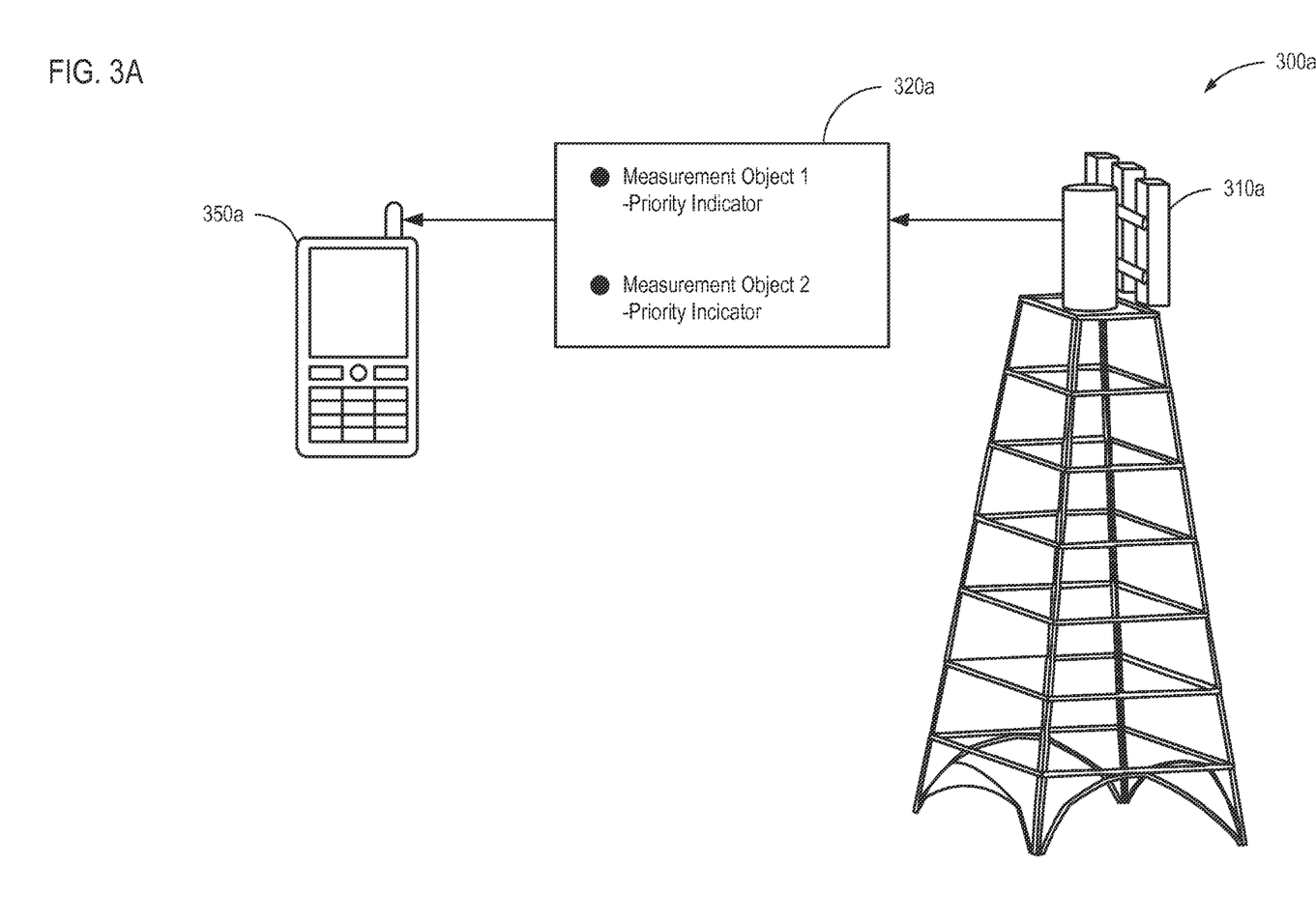
FIG. 3A is a schematic diagram of a system including an eNB configured to indicate the priority of measurement objects to a UE according to still another embodiment.

FIG. 3A is a schematic diagram of a system 300a including an eNB 310a configured to indicate the priority of measurement objects to a UE 350a according to still another embodiment. The eNB 310a may transmit an IE 320a that includes a list of measurement objects. Each measurement object in the list may include a priority indicator specifying whether that measurement object is higher or lower priority. For example, the priority indicator may be one or more bits that map to different priority levels. In an embodiment, a single IE 320a containing a single list may be transmitted from the eNB 310a to the UE 350a. Alternatively, an IE 320a containing a list that includes measurement objects with priority indicators may be transmitted as well as an IE (not shown) containing a list that includes measurement objects without priority indicators (e.g., a list containing measurement objects able to be processed by a legacy UE). The two lists may be duplicative of each other. The UE 350a may determine the measurement order based on the priority indicators.

Figure 3B:
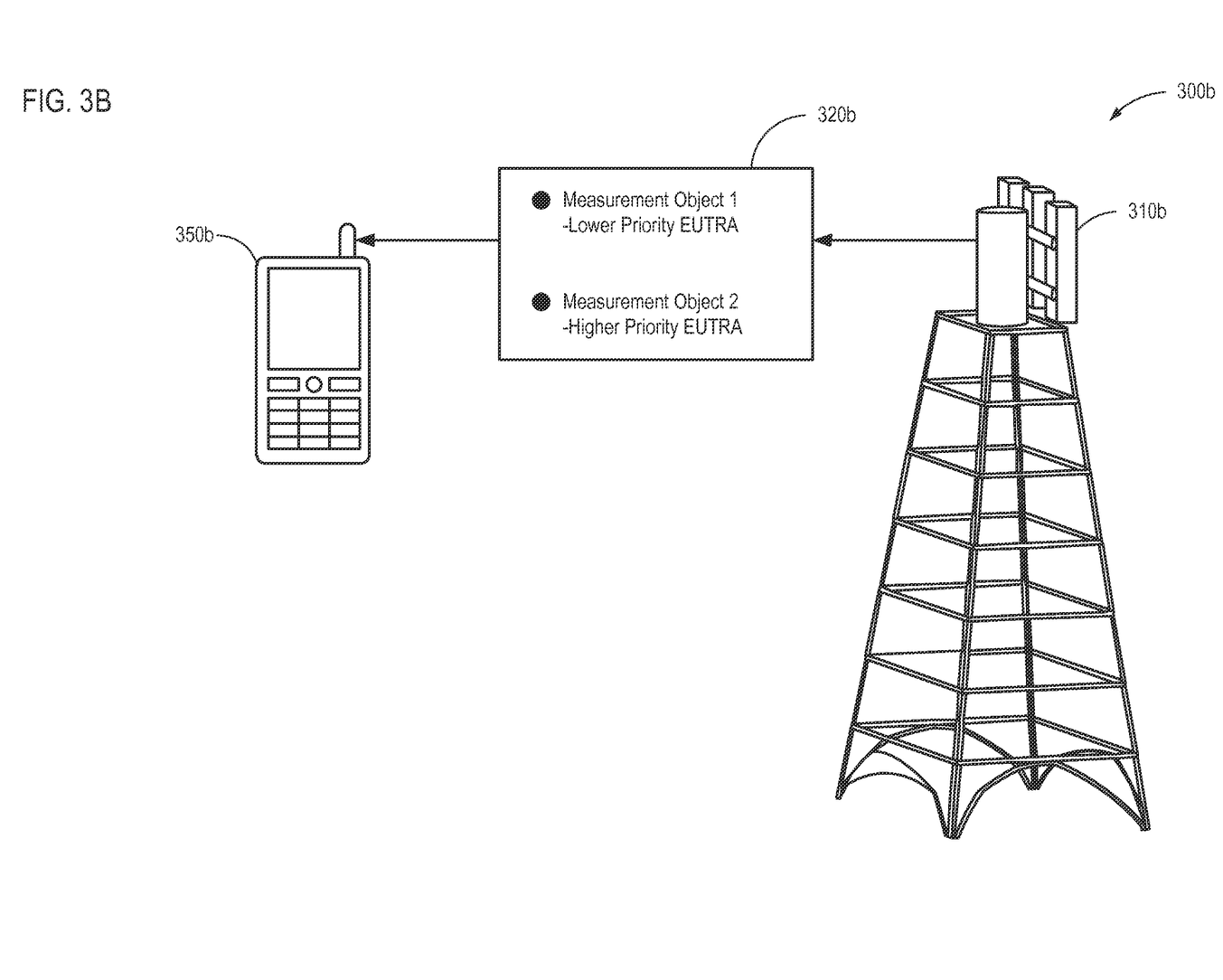
FIG. 3B is a schematic diagram of a system including an eNB configured to indicate the priority of measurement objects to a UE according to still another embodiment.

FIG. 3B is a schematic diagram of a system 300b including an eNB 310b configured to indicate the priority of measurement objects to a UE 350b according to still another embodiment. The eNB 310b may transmit an IE 320b that includes a list of measurement objects. The type of measurement object may be different depending on whether the measurements have a higher priority or a lower priority. For example, a first measurement object may be a lower priority measurement object and a second measurement object may be a higher priority measurement object. In some embodiments, a normal priority measurement object may be included for every measurement to be performed so as to support legacy UEs. Additional low or high priority measurement objects may be included for those measurement objects to receive a different priority treatment. A legacy UE may disregard the additional low or high priority measurement objects and use the normal priority measurement objects to perform measurements. A UE able to handle different priorities may disregard duplicative normal priority measurement objects and use the unique normal and high or low priority measurement objects to perform measurements. In alternate embodiments, only a single measurement object may be transmitted for each measurement to be performed.

Figure 4:
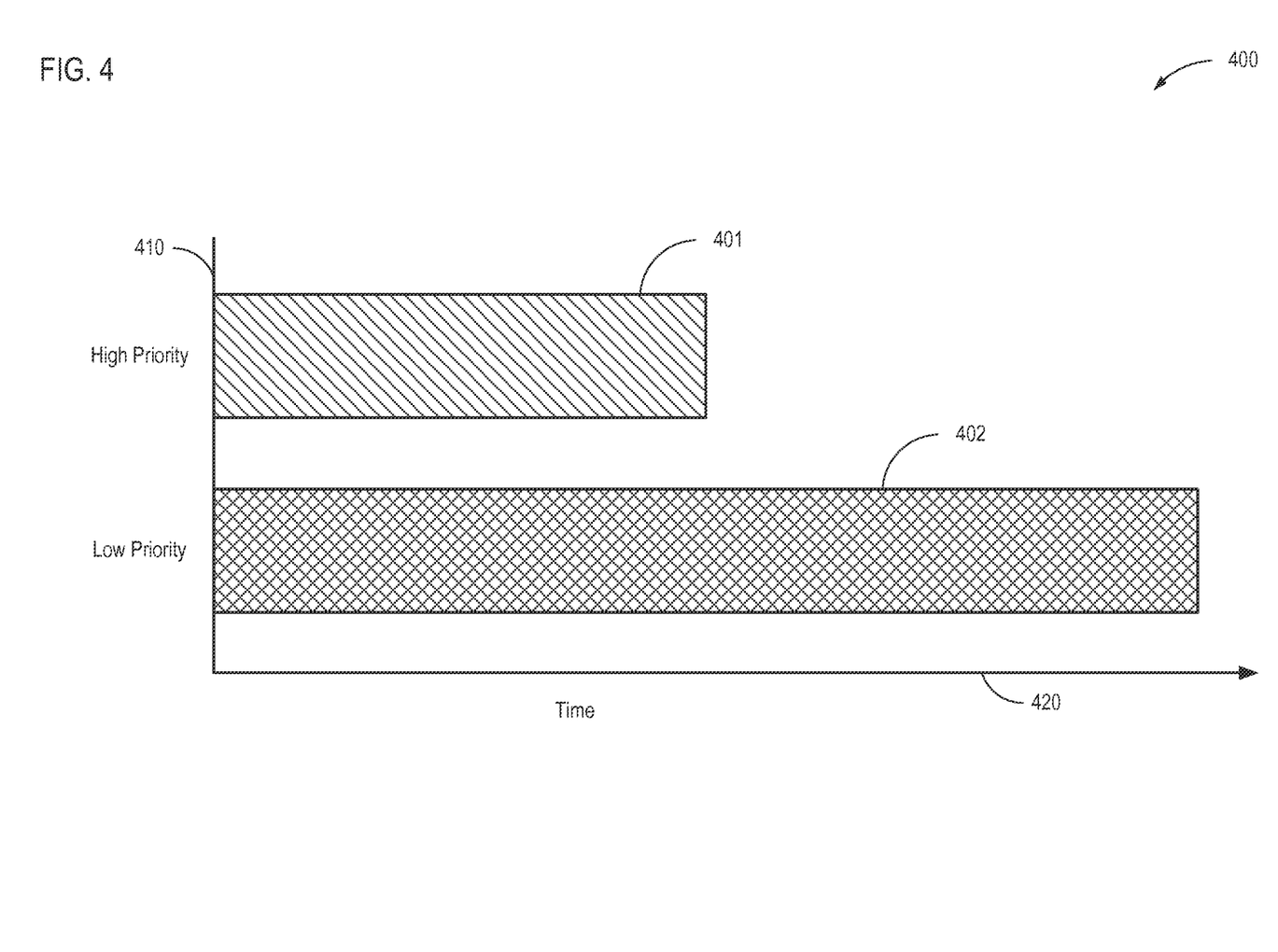
FIG. 4 is a chart illustrating delay requirements for a higher priority measurement and a lower priority measurement.

FIG. 4 is a chart 400 illustrating delay requirements 401, 402 for a higher priority measurement and a lower priority measurement. The chart includes a y-axis 410 listing each delay requirement 401, 402 and a time axis 420 indicating the amount of time mandated by each delay requirement 401, 402. A lower priority delay requirement 402 may differ from a higher priority delay requirement 401 by a scaling factor, and/or each may differ from a legacy delay requirement by a corresponding scaling factor. For example, in the illustrated embodiment, the lower priority delay requirement 402 may be twice as large as the higher priority delay requirement 401 (e.g., higher priority measurements must be performed twice as often as lower priority measurements in the illustrated embodiment). In some embodiments, one of the higher priority delay requirement 401 and the lower priority delay requirement 402 may be a normal priority delay requirement from which the other is scaled. For example, the higher priority delay requirement 401 may be the normal priority delay requirement, and a scaling factor may be two. Alternatively, the lower priority delay requirement 402 may be the normal priority delay requirement, and a scaling factor may be one half. In other embodiments, each delay requirement may be explicitly defined rather than being related to another delay requirement.

Figure 5:
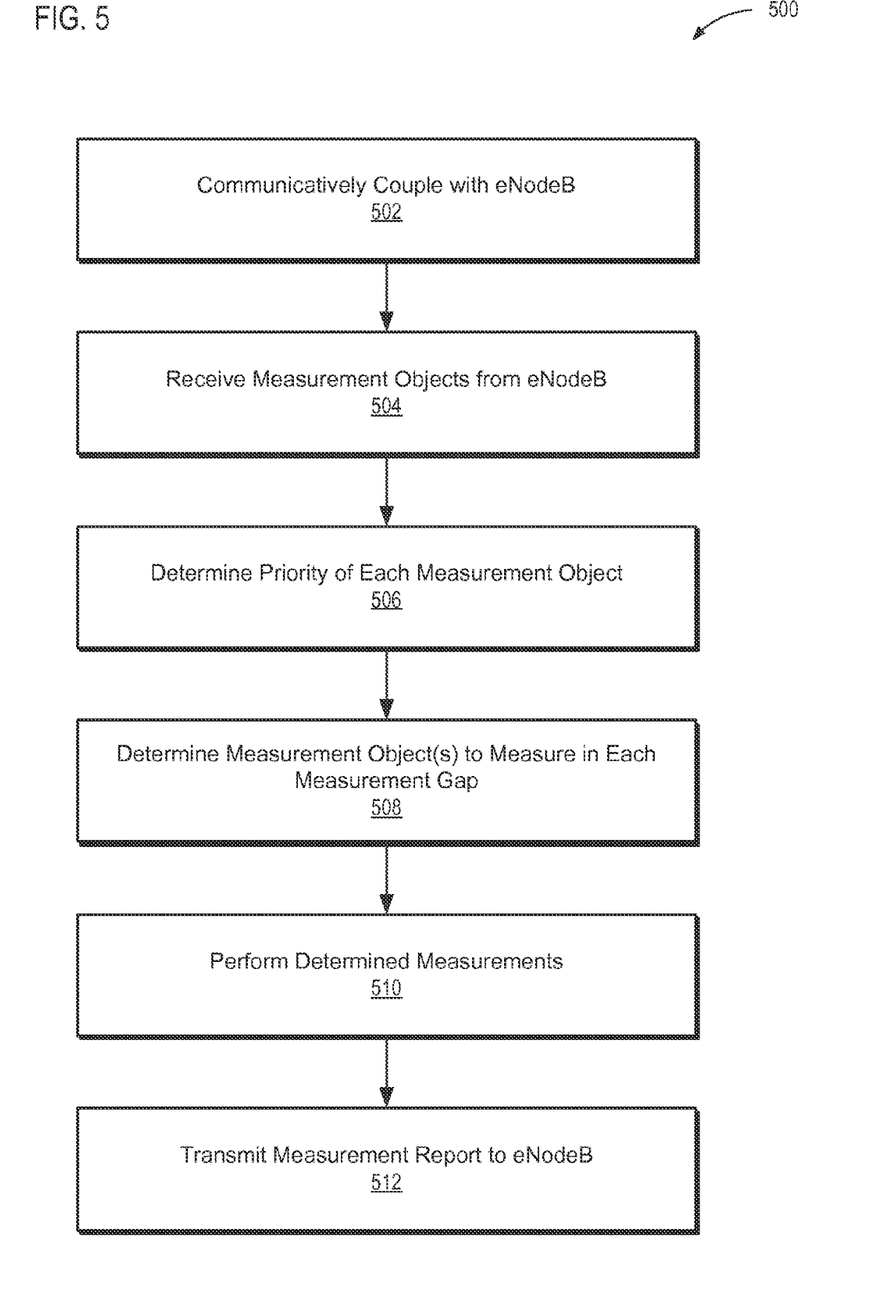
FIG. 5 is a flow diagram of a method for performing prioritized inter-frequency measurements.

FIG. 5 is a flow diagram of a method 500 for performing prioritized inter-frequency measurements. The method 500 may begin with communicatively coupling 502 with an eNB. For example, a connection may be set up with the eNB. Measurement objects may be received 504 from the eNB. The measurement objects may be received as part of the connection set up or after the connection has been set up (e.g., in an RRC connection reconfiguration message). The measurement objects may indicate their priority and/or the priority may be determinable from the IE in which the measurement object is transmitted. For example, any of the previously discussed formats for indicating priorities of measurement objects may be used for transmitting the measurement objects. The priority of each measurement object 506 may be determined from the transmission. For example, a type of measurement object may be determined, a priority indicator may be read, a priority associated with a list including one or more measurement objects may be determined, and/or the like.

For each measurement gap, one or more measurement objects to be measured in that gap may be determined 508 based on the determined priority. The measurement object(s) for each gap may be selected so as to meet the delay requirements associated with the priority of that measurement object. For example, the delay requirement may be determined from the priority, and the measurement to be performed may be determined by comparing the available measurement gaps to the delay requirements of the received measurement objects. Next, the determined measurements may be performed 510. For example, the RSRP, RSRQ, and/or the like for each signal indicated by a measurement object may be computed from measurements of the signal. A measurement report indicating the results of the measurements may be transmitted 510 to the eNB. The measurements may be evaluated to determine whether a new cell should be selected. One or more elements of the method 500 may be repeated at a later point in time if a new cell is not selected.

Figure 6:
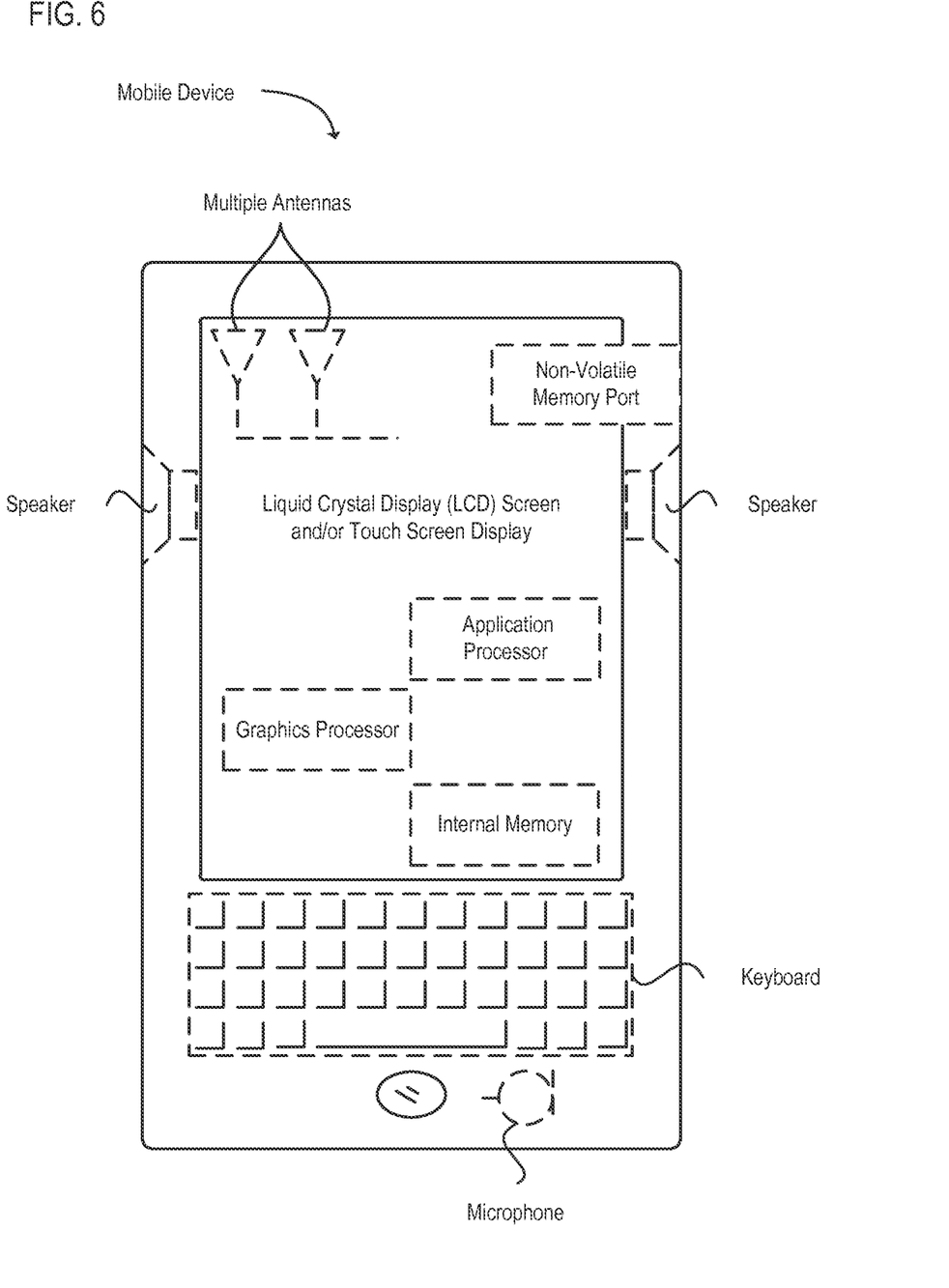
FIG. 6 is a schematic diagram of a UE able to prioritize inter-frequency measurements according to received measurement objects.

FIG. 6 is an example illustration of a mobile device, such as a UE, a mobile station (MS), a mobile wireless device, a mobile communication device, a tablet, a handset, or another type of wireless communication device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard, including 3GPP LTE, WiMAX, high speed packet access (HSPA), Bluetooth, and Wi-Fi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 6 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

EXAMPLES

The following examples pertain to further embodiments:

Example 1 is a UE configured to communicate with an E-UTRAN. The UE includes a transceiver and a processor coupled to the transceiver. The processor is configured to receive a list of frequencies. The list of frequencies indicates a priority of each frequency. The processor is also configured to determine one or more of the frequencies to be measured in a measurement gap. The one or more frequencies to be measured are determined based on the priority of each frequency.

In Example 2, receiving the list of Example 1 includes receiving a first list of frequencies to receive a lower priority and a second list of frequencies to receive a higher priority.

In Example 3, receiving the first and second lists of Example 2 includes receiving a first information element including the first list and a second information element including the second list.

In Example 4, receiving the first and second lists of Example 2 includes receiving an information element including the first and second lists.

In Example 5, each frequency of any of Examples 1-4 includes a priority indicator.

In Example 6, the list of frequencies of any of Examples 1-5 includes a lower priority frequency and a higher priority frequency.

In Example 7, the list of frequencies of any of Examples 1-6 indicates frequencies to receive a normal priority and frequencies to receive a low priority.

In Example 8, the list of frequencies of any of Examples 1-6 indicates frequencies to receive a normal priority and frequencies to receive a high priority.

Example 9 is a method for indicating measurement priority. The method includes determining, using a processor, one or more RATs and a plurality of frequencies for each RAT at which to perform measurements. The method also includes determining, using the processor, a priority for each frequency. The method also includes indicating the frequencies and the priority for each frequency to a wireless communication device.

In Example 10, indicating the frequencies of Example 9 includes indicating a first set of frequencies should receive a lower priority and a second set of frequencies should receive a higher priority.

In Example 11, indicating the first set of frequencies and the second set of frequencies of Example 10 includes transmitting a single data structure including indications of the first and second sets of frequencies.

In Example 12, indicating the first set of frequencies and the second set of frequencies of Example 10 includes transmitting separate indications of the first and second sets of frequencies without transmitting a single data structure including indications of the first and second sets of frequencies.

In Example 13, indicating the frequencies and the priority for each frequency of any of Example 9-12 includes transmitting a priority indicator for each frequency.

In Example 14, indicating the frequencies and the priority for each frequency of any of Examples 9-13 includes transmitting one of a higher priority data structure and a lower priority data structure for each frequency.

In Example 15, indicating the priority of any of Examples 9-14 includes one of indicating normal priority and low priority frequencies and indicating normal priority and high priority frequencies.

Example 16 is an apparatus including means to perform a method as described in any of Examples 9-15.

Example 17 is at least one computer-readable storage medium having stored thereon computer-readable instructions, which when executed, implement a method or realize an apparatus as describe in any of preceding example.

Example 18 is a wireless communication device including circuitry. The circuitry is configured to communicatively couple to a base station. The circuitry is also configured to receive, from the base station, information identifying signals from nearby base stations to be measured. A priority for measuring each signal is determinable from the information.

In Example 19, the information of Example 18 includes a combined list of signals. The combined list includes a first list of signals to receive a first priority and a second list of signals to receive a second priority.

In Example 20, the information of Example 18 includes a first list of signals to receive a first priority and a second list of signals to receive a second priority without combining the first and second lists.

In Example 21, the information of any of Examples 18-20 includes an indication of priority for each signal.

In Example 22, the information of any of Examples 18-21 includes an element indicative of type of signal and priority.

In Example 23, the information of any of Examples 18-22 is selected from the group consisting of information differentiating low priority and normal priority signals and information differentiating normal priority and high priority signals. A scaling factor for a delay requirement is selected based on the priority.

Example 24 is an eNB configured to communicatively couple to a UE. The eNB includes a transceiver and a processor coupled to the transceiver. The processor is configured to determine one or more RATs and a plurality of frequencies for each RAT at which to perform measurements. The processor is also configured to determine a priority for each frequency. The processor is also configured to indicate the frequencies and the priority for each frequency to a wireless communication device.

In Example 25, the processor of Example 24 is configured to indicate a first set of frequencies should receive a lower priority and a second set of frequencies should receive a higher priority.

In Example 26, the processor of Example 25 is configured to indicate the first set of frequencies and the second set of frequencies by transmitting a single data structure including indications of the first and second sets of frequencies.

In Example 27, the processor of Example 25 is configured to indicate the first set of frequencies and the second set of frequencies by transmitting separate indications of the first and second sets of frequencies without transmitting a single data structure including indications of the first and second sets of frequencies.

In Example 28, the processor of any of Examples 24-27 is configured to indicate the frequencies and the priority for each frequency by transmitting a priority indicator for each frequency.

In Example 29, the processor of any of Examples 24-28 is configured to indicate the frequencies and the priority for each frequency by transmitting one of a higher priority data structure and a lower priority data structure for each frequency.

In Example 30, the processor of any of Examples 24-29 is configured to indicate the priority by one of indicating normal priority and low priority frequencies and indicating normal priority and high priority frequencies.

Example 31 is a method for prioritizing inter-frequency measurements. The method includes receiving a list of frequencies. The list of frequencies indicates a priority of each frequency. The method also includes determining one or more of the frequencies to be measured in a measurement gap. The one or more frequencies to be measured are determined based on the priority of each frequency.

In Example 32, receiving the list of Example 31 includes receiving a first list of frequencies to receive a lower priority and a second list of frequencies to receive a higher priority.

In Example 33, receiving the first and second lists of Example 32 includes receiving a first information element including the first list and a second information element including the second list.

In Example 34, receiving the first and second lists of Example 32 includes receiving an information element including the first and second lists.

In Example 35, each frequency of any of Examples 31-34 includes a priority indicator.

In Example 36, the list of frequencies of any of Examples 31-35 includes a lower priority frequency and a higher priority frequency.

In Example 37, the list of frequencies of any of Examples 31-36 indicates frequencies to receive a normal priority and frequencies to receive a low priority.

In Example 38, the list of frequencies of any of Examples 31-36 indicates frequencies to receive a normal priority and frequencies to receive a high priority.

Example 39 is a base station for indicating measurement priority. The base station includes circuitry. The circuitry is configured to determine a plurality of frequencies at which to perform measurements. The circuitry is also configured to determine a priority for each frequency. The circuitry is also configured to indicate the frequencies and the priority for each frequency to a wireless communication device.

In Example 40, the circuitry of Example 39 is configured to indicate the frequencies by indicating a first set of frequencies should receive a lower priority and a second set of frequencies should receive a higher priority.

In Example 41, the circuitry of Example 40 is configured to indicate the first set of frequencies and the second set of frequencies by transmitting a single data structure including indications of the first and second sets of frequencies.

In Example 42, the circuitry of Example 40 is configured to indicate the first set of frequencies and the second set of frequencies by transmitting separate indications of the first and second sets of frequencies without transmitting a single data structure including indications of the first and second sets of frequencies.

In Example 43, the circuitry of any of Examples 39-42 is configured to indicate the frequencies and the priority for each frequency by transmitting a priority indicator for each frequency.

In Example 44, the circuitry of any of Examples 39-43 is configured to indicate the frequencies and the priority for each frequency by transmitting one of a higher priority data structure and a lower priority data structure for each frequency.

In Example 45, the circuitry of any of Examples 39-44 is configured to indicate the priority by one of indicating normal priority and low priority frequencies and indicating normal priority and high priority frequencies.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium, wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the disclosure is not to be limited to the details given herein, but may be modified within the scope and equivalents of the appended claims.

Those having skill in the art will appreciate that many changes may be made to the details of the above-described embodiments without departing from the underlying principles of the disclosure. The scope of the present application should, therefore, be determined only by the following claims.

The invention claimed is:

1. User equipment (UE) configured to communicate with an evolved universal terrestrial radio access network (E-UTRAN), the UE comprising:
   a transceiver; and
   a processor coupled to the transceiver, the processor configured to:
   receive a list of frequencies, wherein the list of frequencies indicates a priority of each frequency; and
   determine an order for one or more of the frequencies to be measured in a measurement gap, wherein the order for the one or more frequencies to be measured is determined based on the priority of each frequency and a delay requirement for each frequency measurement.

2. The UE of claim 1, wherein receiving the list comprises receiving a first list of frequencies to receive a lower priority and a second list of frequencies to receive a higher priority.

3. The UE of claim 2, wherein receiving the first and second lists comprises receiving a first information element comprising the first list and a second information element comprising the second list.

4. The UE of claim 2, wherein receiving the first and second lists comprises receiving an information element comprising the first and second lists.

5. The UE of claim 1, wherein each frequency includes a priority indicator.

6. The UE of claim 1, wherein the list of frequencies includes a lower priority frequency and a higher priority frequency.

7. The UE of claim 1, wherein the list of frequencies indicates frequencies to receive a normal priority and frequencies to receive a low priority.

8. The UE of claim 1, wherein the list of frequencies indicates frequencies to receive a normal priority and frequencies to receive a high priority.

9. A wireless communication device comprising:
first circuitry configured to communicatively couple the wireless communication device to a base station; and
second circuitry configured to receive, from the base station, information identifying signals from nearby base stations to be measured, wherein a priority for measuring each signal and a delay requirement for measuring each signal are determinable from the information, and determine an order for one or more of the frequencies to be measured in a measurement gap based on the priority and the delay requirement for measuring each signal.

10. The device of claim 9, wherein the information includes a combined list of signals, and wherein the combined list includes a first list of signals to receive a first priority and a second list of signals to receive a second priority.

11. The device of claim 9, wherein the information includes a first list of signals to receive a first priority and a second list of signals to receive a second priority without combining the first and second lists.

12. The device of claim 9, wherein the information includes an indication of priority for each signal.

13. The device of claim 9, wherein the information includes an element indicative of type of signal and priority.

14. The device of claim 9, wherein the information is selected from the group consisting of information differentiating low priority and normal priority signals and information differentiating normal priority and high priority signals, and wherein a scaling factor for the delay requirement is selected based on the priority.

* * * * *